(12) United States Patent
Callanan et al.

(10) Patent No.: US 7,774,416 B2
(45) Date of Patent: Aug. 10, 2010

(54) OPTIMIZING THE EXPECTATION OF A RESPONSE IN INSTANT MESSAGING WITH AN AUTOMATIC HIERARCHICAL INSTANT MESSAGE ASSISTANT

(75) Inventors: Sean Callanan, Churtown (IE); Al Chakra, Cary, NC (US); Sonya Purcell, Cashel (IE); Hugh P. Smyth, Clontarf (IE)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 11/828,889

(22) Filed: Jul. 26, 2007

(65) Prior Publication Data

US 2009/0030992 A1    Jan. 29, 2009

(51) Int. Cl.
*G06F 15/16* (2006.01)
(52) U.S. Cl. .................. 709/206; 709/203; 709/204; 709/205; 709/224; 705/8; 455/416
(58) Field of Classification Search ......... 709/203–206, 709/224; 455/416; 705/8
See application file for complete search history.

(56) References Cited

U.S. PATENT DOCUMENTS

| 2004/0003042 | A1* | 1/2004 | Horvitz et al. | 709/204 |
| 2004/0162882 | A1* | 8/2004 | Mora | 709/207 |
| 2005/0149622 | A1* | 7/2005 | Kirkland et al. | 709/207 |
| 2005/0289180 | A1* | 12/2005 | Pabla et al. | 707/104.1 |
| 2006/0080130 | A1* | 4/2006 | Choksi | 705/1 |
| 2007/0033251 | A1* | 2/2007 | Mandalia et al. | 709/204 |
| 2007/0043814 | A1* | 2/2007 | Allen et al. | 709/206 |
| 2007/0133437 | A1* | 6/2007 | Wengrovitz et al. | 370/260 |
| 2007/0253424 | A1* | 11/2007 | Herot et al. | 370/395.2 |
| 2008/0147795 | A1* | 6/2008 | Heidloff et al. | 709/204 |

* cited by examiner

*Primary Examiner*—Nathan Flynn
*Assistant Examiner*—Mohammad A Siddiqi
(74) *Attorney, Agent, or Firm*—Dillon & Yudell LLP (57) ABSTRACT

A method, system and computer-readable medium for enhanced instant messaging in a data processing system are disclosed. The instant messaging application detects a number of instant messaging sessions of a first messaging participant with a number of other messaging participants and detects a hierarchy class of each of the other messaging participants. The application calculates an average response time for each of hierarchy classes. The application determines whether the average response time for each hierarchy class exceeds a predefined threshold. If the average response time does not exceed the threshold the application displays an indication of the average response time for the hierarchy class to each of the other messaging participants of the hierarchy class. If the average response time does exceed the threshold, the application displays an indication to each of the other messaging participants of the hierarchy class that the first messaging participant is unable to respond.

8 Claims, 5 Drawing Sheets

OPTIMIZING THE EXPECTATION OF A RESPONSE IN INSTANT MESSAGING WITH AN AUTOMATIC HIERARCHICAL INSTANT MESSAGE ASSISTANT

BACKGROUND OF THE INVENTION

The present invention relates in general to the field of computers and similar technologies, and in particular to instant messaging applications.

Instant messaging has become a primary method of communication in the corporate world, as well as the social world. As a person's use of instant messaging increases, that person has to manage a greater number of instant messaging sessions. Consider the situation in a corporate setting where an employee has developed a reputation within the organization as being a very dependable source of advice and information. This employee relies on an instant messaging application to communicate with coworkers (or customers). As the employee becomes more popular, the employee receives an increasing number of instant messages from coworkers. It takes the employee longer and longer to reply to a given message, since the employee now has more messages to respond to. Eventually, some messages may not be responded to at all.

While the employee is very busy responding to all of the instant messages, coworkers sit and wait for a response, unaware of the reasons for the delay or how long the wait will be. This can lead to feelings of frustration and neglect on the part of the person waiting for a response. The employee may not be able to log out of the instant messaging program, or set the user status to "busy" or "unavailable", because the employee must be available to respond to instant messages from certain "key" senders, such as a boss, a high-ranking corporate official or a preferred customer. The employee's reputation as a dependable source of information and the resulting popularity has paradoxically caused the employee to become a less dependable source of information.

BRIEF SUMMARY OF THE INVENTION

The present invention thus provides a method, system and computer program product for enhanced instant messaging in a data processing system. The instant messaging application detects a number of instant messaging sessions of a first messaging participant with a number of other messaging participants. The instant messaging application detects the hierarchy class of each of the other messaging participants. The instant messaging application calculates an average response time for each of hierarchy classes. The instant messaging application determines whether the average response time for each hierarchy class exceeds a predefined threshold. If the average response time does not exceed the threshold the instant messaging application displays an indication of the average response time for the hierarchy class to each of the other messaging participants of the hierarchy class. If the average response time does exceed the threshold, the instant messaging application displays an indication to each of the other messaging participants of the hierarchy class that the first messaging participant is unable to respond.

The above, as well as additional purposes, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE INVENTION

An illustrative embodiment of the present invention is directed to an enhanced instant messaging application of a data processing system. The instant messaging application optimizes a user's expectation of a response from a potential messaging participant based upon the average response time of the participant to members of the same hierarchical class as the user. If the average response time is less than a predefined threshold, then an indication of an expected response time is displayed to the user based on the average response time. If the average response time exceeds the predefined threshold, then a notification is displayed to the user indicating that the participant is unable to respond to an instant message, and may suggest alternatively communicating via email. The present invention can take the form of an entirely hardware embodiment, an entirely software embodiment or an embodiment containing both hardware and software elements. In an illustrative embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

The medium can be an electronic, magnetic, optical, electromagnetic, infrared or semiconductor system, apparatus or device or a propagation medium. Examples of a computer-readable medium include a semiconductor or solid state memory (e.g., flash drive memory), magnetic tape, a removable computer diskette, a random access memory (RAM), a read-only memory (ROM), a rigid magnetic disk (e.g., a hard drive) and an optical disk. Current examples of optical disks include compact disk-read only memory (CD-ROM), compact disk-read/write (CD-R/W) and Digital Versatile Disk (DVD).

Figure 1:
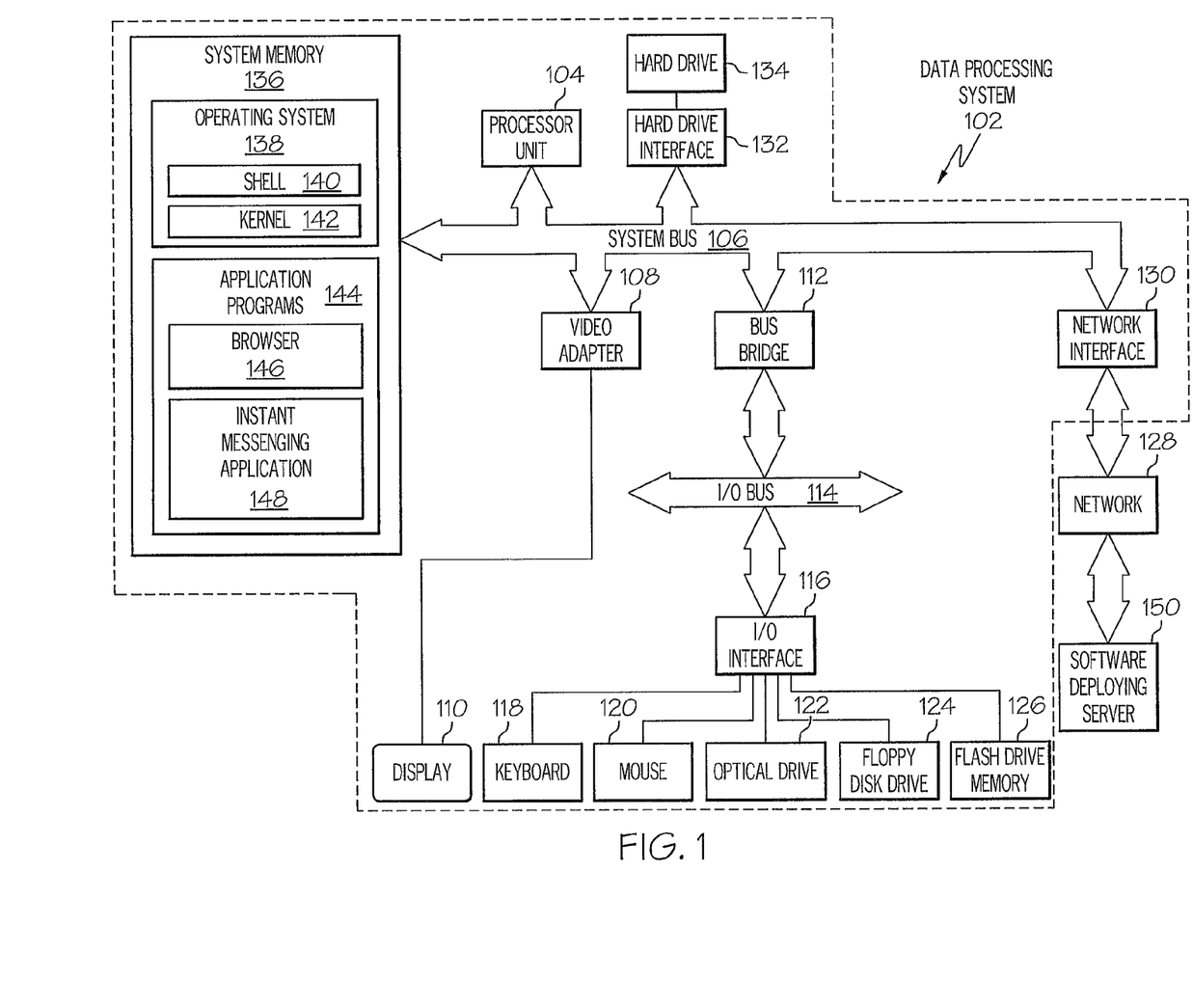
FIG. 1 is a block diagram of an exemplary data processing system in which the present invention may implemented.

Referring now to the drawings, wherein like numbers denote like parts throughout the several views, FIG. 1 shows a block diagram of a data processing system suitable for storing and/or executing program code in accordance with one or more embodiments of the present invention. The hardware elements depicted in data processing system 102 are not intended to be exhaustive, but rather are representative to highlight essential components required by the present invention. Data processing system 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, an optical disk drive 122, a floppy disk drive 124, and a flash drive memory 126. The format of the ports connected to I/0 interface 116 may be any known to those skilled in the art of computer architecture, including but not limited to Universal Serial Bus (USB) ports.

Data processing system 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Software deploying server 150 may utilize a similar architecture design as that described for data processing system 102.

A hard drive interface 132 is also coupled to system bus 106. Hard drive interface 132 interfaces with hard drive 134. In a preferred embodiment, hard drive 134 populates a system memory 136, which is also coupled to system bus 106. Data that populates system memory 136 includes an operating system (OS) 138 of data processing system 102 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (www) client (i.e., data processing system 102) to send and receive network messages to the Internet using HyperText Transfer Protocol (HTTP) messaging, thus enabling communication with software deploying server 150.

Application programs 144 in the system memory of data processing system 102 (as well as the system memory of software deploying server 150) also include an instant messaging application 148. Instant messaging application 148 comprises computer-executable code, at least a portion of which implements the method described herein with reference to FIG. 2. In one embodiment, data processing system 102 is able to download instant messaging application 148 from software deploying server 150.

The hardware elements depicted in data processing system 102 are not intended to be exhaustive, but rather are representative to highlight essential components required by the present invention. For instance, data processing system 102 may include alternate memory storage devices such as magnetic cassettes, Digital Versatile Disks (DVDs), Bernoulli cartridges, and the like. These and other variations are intended to be within the spirit and scope of the present invention.

Note further that, in one embodiment of the present invention, software deploying server 150 performs all of the functions associated with the present invention (including execution of instant messaging application 148), thus freeing data processing system 102 from having to use its own internal computing resources to execute instant messaging application 148.

Figure 2:
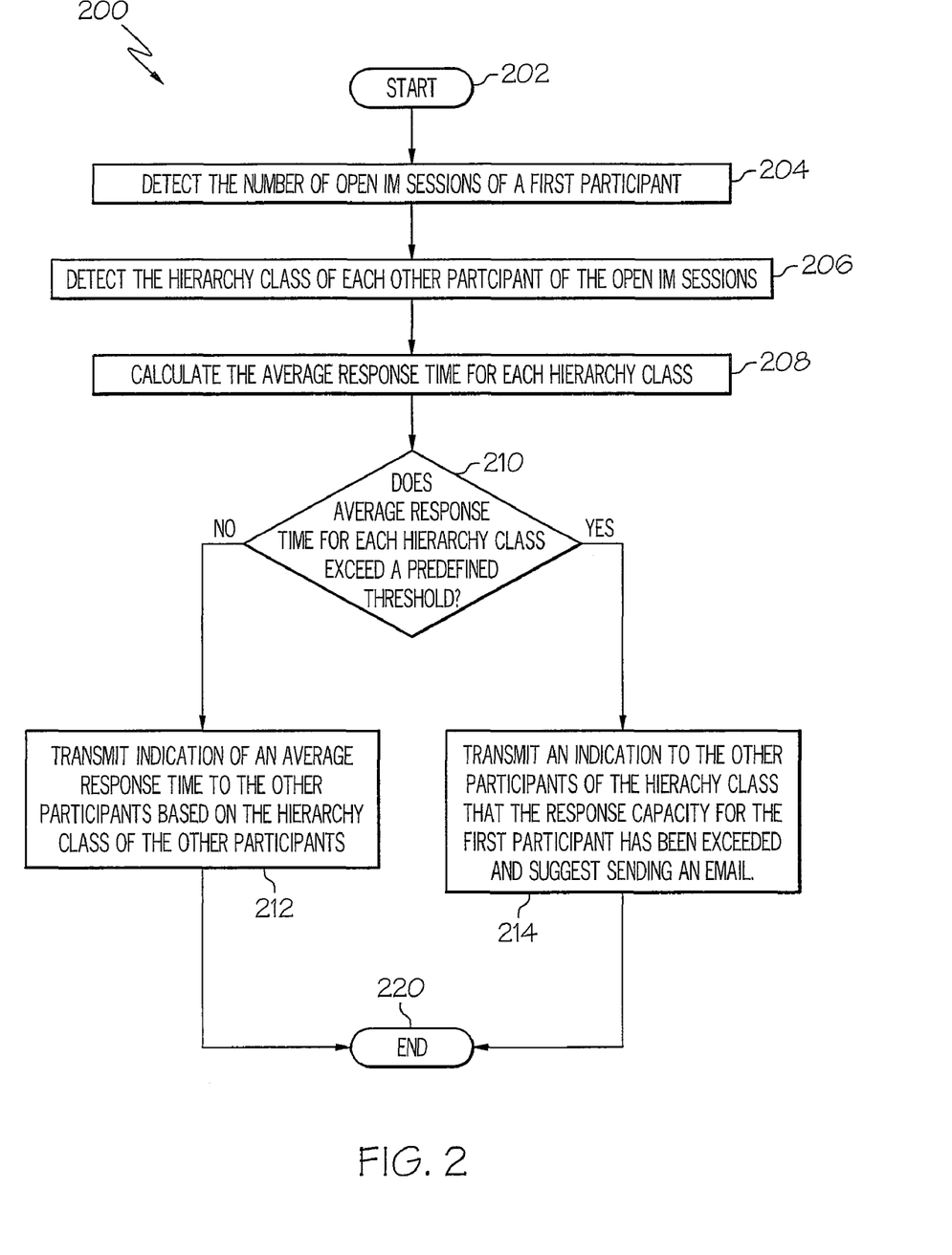
FIG. 2 is a flowchart of an exemplary method for providing an enhanced instant messaging application.

With reference now to FIG. 2, a flowchart of an exemplary method for providing an enhanced instant messaging application is shown. The following method can be implemented as executable program code in instant messaging application 148 of data processing system 102 and begins at initiator block 202. Instant messaging application 148 detects the number of open instant messaging sessions of a messaging participant, hereinafter referred to as a "first participant" (step 204). Each participant who wishes to communicate with the first participant via instant messaging application 148 belongs to one of several predefined hierarchical classes of messaging participants ("hierarchy class"). The hierarchy classes are used to determine the priority of response by the first participant. For example, a high-ranking corporate official is assigned to a hierarchy class with a higher priority than other employees. The hierarchy classes may be defined by the first participant, or the hierarchy classes may be defined by a central directory service such as a lightweight directory access protocol (LDAP) server. In step 206, instant messaging application 148 detects the hierarchy class of each participant of each open instant messaging session with the first participant. Instant messaging application 148 calculates the average time it takes the first participant to respond to a participant in each hierarchy class (step 208). For example, instant messaging application 148 calculates that the average response time for participants of hierarchy class A is 12 seconds, the average response time for participants of hierarchy class B is 4 minutes, and the average response time for participants of hierarchy class C is 10 minutes.

Instant messaging application 148 determines whether the average response time for each hierarchy class exceeds a predefined threshold for response time for that hierarchy class (step 210). If the average response time exceeds the predefined threshold for a hierarchy class, instant messaging application 148 transmits a notification to each participant of the hierarchy class that the response capacity for the first participant has been exceeded (step 214). The notification informs other participants of the first participant's inability to respond and may suggest alternatively contacting the first participant by email. In one embodiment, instant messaging application 148 includes a facility that enables a participant to send an email to the first participant directly from an instant messaging window (see 200 of FIG. 3) in the event that the first participant's response capacity has been exceeded. If the average response time does not exceed the predefined threshold for a hierarchy class, instant messaging application 148 displays an indication of the average response time for the hierarchy class to each participant of the hierarchy class.

Figure 3:
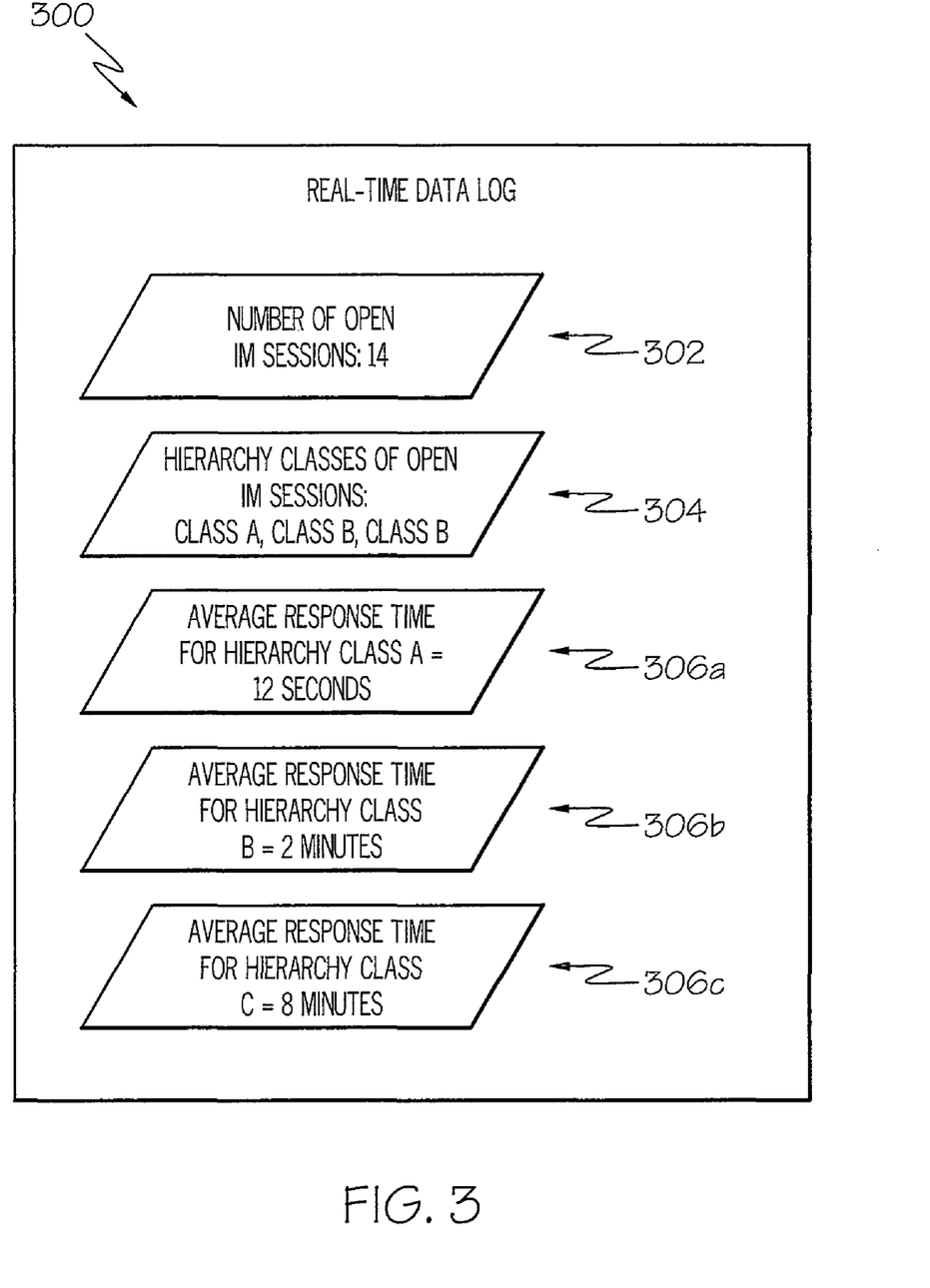
FIG. 3 is a diagram depicting an exemplary real-time data log that is maintained by one or more embodiments of an enhanced instant messaging application.

With reference now to FIG. 3, a diagram is shown depicting an exemplary real-time data log 300 that is maintained by one or more embodiments of instant messaging application 148. A computer-readable medium (e.g., system memory 136, hard drive 134) comprises a real-time data log encoded with data. The data includes the number of open instant messaging sessions of the first participant (data 302), the hierarchy classes of the open instant messaging sessions of the first participant (data 304) and the average response time (data 306*a-c*) for each hierarchy class of data 304. By calculating a separate average response time for each hierarchy class, instant messaging application 148 is able to provide a quicker response time to higher priority participants while efficiently managing the response expectations of lower priority participants. As shown in the example of FIG. 3, there are 14 open instant messaging (IM) sessions. The participants of these IM sessions fall into three hierarchy classes: class A, class B and class C. Class A represents participants of higher priority, such as preferred customers or high-ranking corporate official. The corresponding average response time is 12 seconds. This response time is lower than the other classes, enabling the higher priority participants of Class A to have an expectation of a quicker response time from the first participant. Class C represents participants of lower priority, such as subordinate co-workers. The corresponding average response time is 8 minutes. This response time is higher than the other classes, enabling the lower priority participants of Class C to have an expectation of a longer response time from the first participant. Class B represents participants of intermediate priority, such as general customers or lateral co-workers. The corresponding average response time is 4 minutes. This response time is between the other two classes in duration, likewise enabling the intermediate priority participants of Class B to have a reasonable expectation of a response time from the first participant. While the example in FIG. 3 illustrates three hierarchy classes, instant messaging application 148 is not limited to three hierarchy classes. There may be many more than three hierarchy classes, enabling a finer granularity over expected response times.

Figure 4:
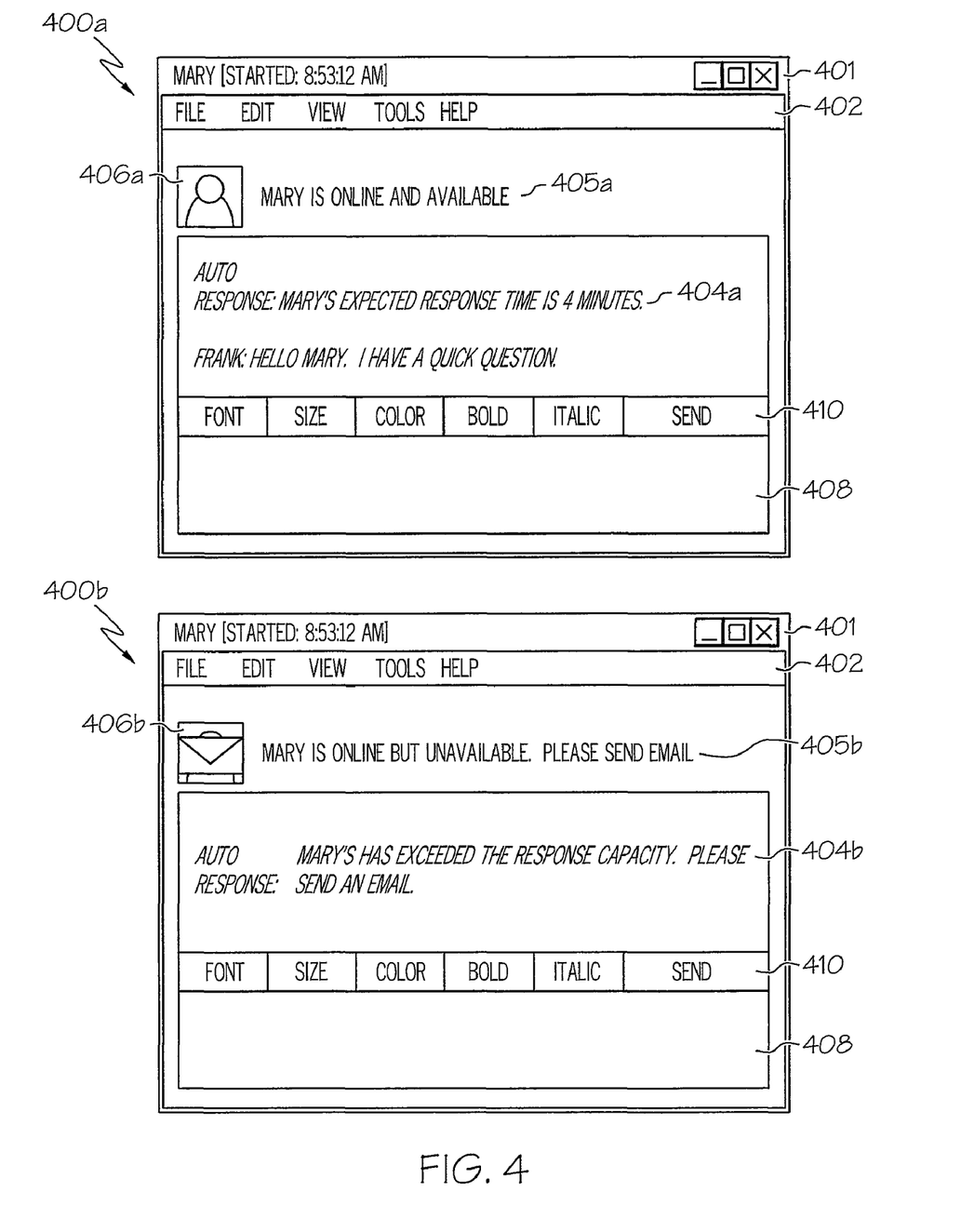
FIG. 4 is a diagram of exemplary messaging windows of an instant messaging application in accordance with one or more embodiments of the present invention.

With reference now to FIG. 4, two diagrams of exemplary messaging windows 400*a-b* of instant messaging application 148 is shown in accordance with one or more embodiments of the present invention. Messaging window 400 may include common user interface elements such as title bar 401, menu bar 402, and toolbar 410. Messaging window 400 also includes a conversation field 404, a text entry field 406 and a status bar 405. Conversation window 404 displays messages sent by participants of the messaging session. Text entry field 408 is where the participant enters the text of a message that the participant wishes to send. Status bar 405 may be used to display the identity and status of one or more target participants. Status bar 405 may include a graphical icon 406. Graphical icon 406 can be used to identify a messaging participant and may indicate the status of that participant.

Messaging window 400*a* is shown depicting an open instant messaging session with a participant identified as "Mary". Graphical icon 406*a* indicates that Mary is online and able to receive instant messages. Status bar 405*a* indicates an expected response time of 4 minutes. This response time corresponds to the average response time for Mary to the hierarchy class of the participant utilizing messaging window 400*a*. Alternatively, an automated response is displayed in text entry field 404*a* that indicates Mary's expected response time. This notification enables the user of messaging window 400*a* to see the status of a participant prior to sending an instant message. In particular, the participant is able to see Mary's expected response time before sending an instant message.

Messaging window 400*b* is shown depicting an open instant messaging session with Mary, where Mary's expected response time has exceeded the threshold for response time. Graphical icon 406*b* indicates that Mary is online but unable to receive additional instant messages and should be contacted via email. Status bar 405*b* indicates that Mary has exceed the response capacity and that she can be contacted via email. This also enables the participant to see the status of a participant prior to sending an instant message. In particular, the participant is able to see that Mary will not be able to respond to an instant message. In one embodiment, the participant may send an email to Mary by entering a message in text entry field 408*b*. When the participant sends the message, instant messaging application automatically sends the text as an email to Mary's email address instead of sending the text as an instant message.

Figure 5:
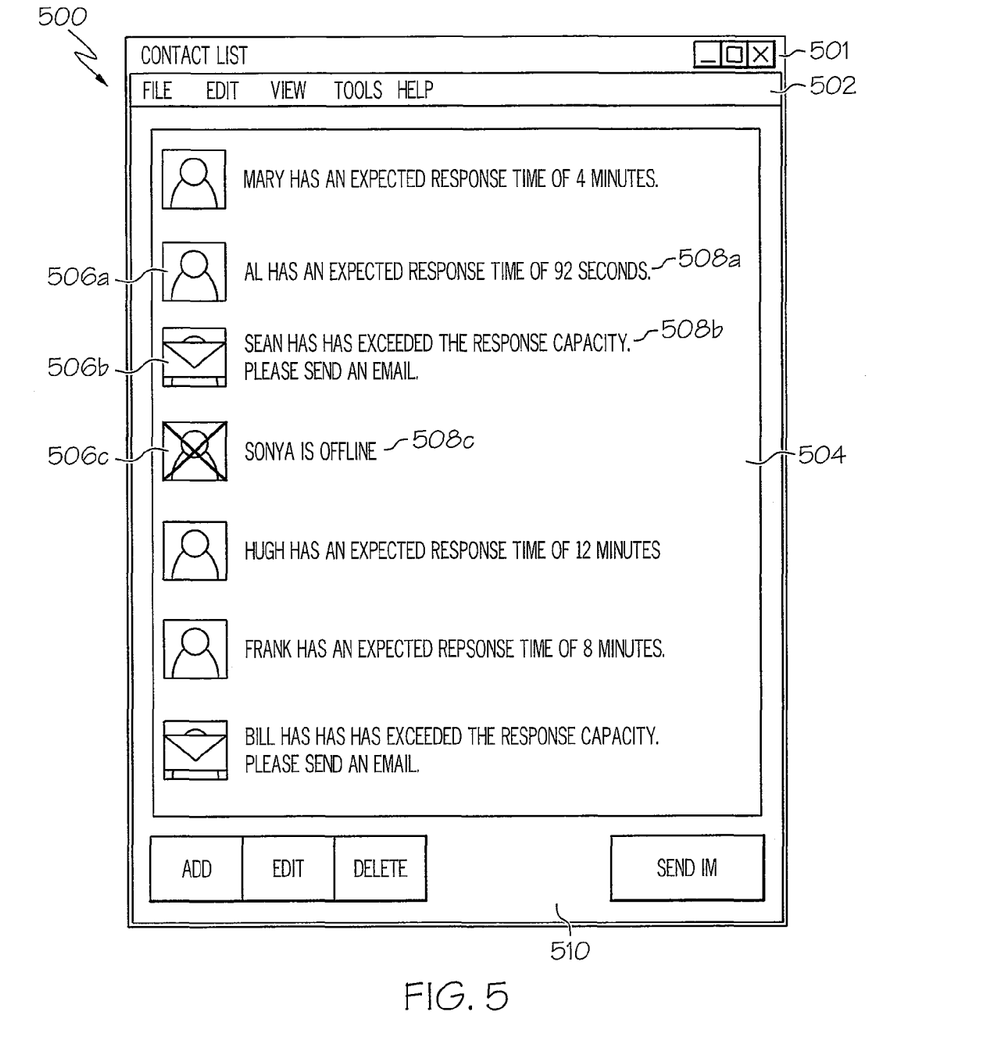
FIG. 5 is a diagram of an exemplary contacts window of an instant messaging application in accordance with one or more embodiments of the present invention.

With reference now to FIG. 5, a diagram of an exemplary contacts window of instant messaging application 148 is shown in accordance with one or more embodiments of the present invention. Contacts window 500 may include common user interface elements such as title bar 501, menu bar 502, and toolbar 510. Contacts window 500 also includes list window 504. List window 504 displays a list of participants who are online and logged in to an instant messaging service. Each list entry 508 displays the identity of each participant and a description of the participant's status. A user of contact window 500 can open an instant messaging session with a participant in list window 504 by selecting the appropriate list entry 508 in list window 504.

List entry 508*a* identifies the username as "Al" and Al's status of having an expected response time of 92 seconds. This response time corresponds to the average response time for Al to the hierarchy class of the participant utilizing contacts window 500. List entry 508*a* also includes graphical icon 506*a*, which provides a graphical indication of Al's status. List entry 508*b* displays the username "Sean" and Sean's status of having exceeded the response capacity. List entry 508*b* also includes a suggestion that Sean be contacted alternatively via email. In one embodiment, selecting list entry opens an email window instead of opening an instant messaging session. In another embodiment, graphical icon 506*b* provides a graphical indication of Sean's status. List entry 508*c* displays the username "Sonya" and Sonya's status of being offline and unable to participate in an instant messaging session. Graphical icon 506*c* provides a graphical indication of Sonya's status. List entries within list window 504 (e.g., entries 508) enable a user of contact window 500 to see the status of a participant prior to opening an instant messaging session. In particular, the user is able to see expected response times before attempting to contact a participant via instant messaging application 148.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, mainframe computers, routers, switches, Personal Digital Assistants (PDA's), telephones, and any other system capable of processing, transmitting, receiving, capturing and/or storing data.

The flowchart and diagrams in the Figures illustrate the architecture, functionality, and operation of possible implementations of systems, methods and computer program products according to various embodiments of the present invention. In this regard, each block in the flowchart or diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block. diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without. departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for instant messaging in a data processing system comprising:
    detecting, using a processor of said data processing system, one or more of instant messaging sessions of a first messaging participant with a plurality of other messaging participants;
    detecting, using said processor, a hierarchy class of each of said other messaging participants;
    calculating, using said processor, an average response time of said first messaging recipient for each of said hierarchy class;
    determining, using said processor, whether said average response time for each of said hierarchy class exceeds a predefined threshold for the hierarchy class;
    in response to determining that said average response time for said hierarchy class does not exceed a predefined threshold, transmitting, using said processor, an indication of the average response time for said hierarchy class to each of said other messaging participants of said hierarchy class; and
    in response to determining that said average response time for said hierarchy class exceeds a predefined threshold for said hierarchy class, transmitting, using said processor, an indication to each of said other messaging participants of said hierarchy class that the first messaging participant is unable to respond.

2. The method of claim 1, further comprising:
    in response to determining that said average response time for said hierarchy class exceeds a predefined threshold, automatically sending, using said processor, an email to said each of said other messaging participants in lieu of an instant message.

3. The method of claim 1, wherein in response to said determining that said average response time does not exceed a predefined threshold further comprises:
    displaying, using said processor, said indication of the average response time in an instant messaging window of respective ones of the other messaging participants.

4. The method of claim 1, wherein said transmitting occurs prior to said other messaging participants sending an instant message.

5. A data processing system comprising:
    a memory;
    at least one processor coupled to said memory via a system bus and having:
        logic for detecting one or more of instant messaging sessions of a first messaging participant with a plurality of other messaging participants;
        logic for detecting a hierarchy class of each of said other messaging participants;
        logic for calculating an average response time of said first messaging recipient for each of said hierarchy class;
        logic for determining whether said average response time for each of said hierarchy class exceeds a predefined threshold for the hierarchy class;
        logic for, in response to determining that said average response time does not exceed a predefined threshold for said hierarchy class, transmitting an indication of the average response time for said hierarchy class to each of said other messaging participants of said hierarchy class; and
        logic for, in response to determining that said average response time for said hierarchy class exceeds a predefined threshold for said hierarchy class, transmitting an indication to each of said other messaging participants of said hierarchy class that the first messaging participant is unable to respond.

6. The data processing system of claim 5, said at least one processor having logic responsive to determining that said average response time for said hierarchy class exceeds a predefined threshold, for automatically sending an email to said each of said other messaging participants in lieu of an instant message.

7. The data processing system of claim 5, said at least one processor having logic responsive to determining that said average response time does not exceed a predefined threshold, for displaying said indication of the average response time in an instant messaging window of respective ones of the other messaging participants.

8. The data processing system of claim 5, wherein said transmitting occurs prior to said other messaging participants sending an instant message.

* * * * *